United States Patent [19]
Dussausse et al.

[11] Patent Number: 5,556,296
[45] Date of Patent: Sep. 17, 1996

[54] ASYMMETRIC CONTACT AND TERMINAL STRIP EQUIPPED WITH SUCH CONTACTS

[75] Inventors: Jean-Paul Dussausse, Paris; Daniel Prudhon, Pierreclos, both of France

[73] Assignee: Filotex, Draveil, France

[21] Appl. No.: 343,942

[22] Filed: Nov. 17, 1994

[30] Foreign Application Priority Data

Nov. 18, 1993 [FR] France .................................. 93 13783

[51] Int. Cl.$^6$ ...................................................... H01R 4/24
[52] U.S. Cl. ........................................... 439/404; 439/941
[58] Field of Search ................................... 439/404, 405, 439/395, 941

[56] References Cited

U.S. PATENT DOCUMENTS

| | | | |
|---|---|---|---|
| 4,367,004 | 1/1983 | Fujiura et al. | 439/404 |
| 4,512,620 | 4/1985 | Tillotson . | |
| 4,846,726 | 7/1989 | Pala | 439/395 |
| 5,326,286 | 7/1994 | Bixles et al. | 439/405 |

FOREIGN PATENT DOCUMENTS

| | | |
|---|---|---|
| 8221294 | 6/1984 | France . |
| 659546A5 | 1/1987 | Switzerland . |

*Primary Examiner*—Neil Abrams
*Assistant Examiner*—Brian J. Biggi
*Attorney, Agent, or Firm*—Sughrue, Mion, Zinn, Macpeak & Seas

[57] ABSTRACT

An asymmetric contact having a first end part for connection to an external conductor and a second end part for elastic coupling with another similar contact. The second end part (4) is offset to one side of the axis of the first end part (1, 2, 3) and to the coupling part (8) between them, and is substantially half the width of the first end part. A terminal strip includes two parallel rows of the contacts facing each other. The contacts are arranged in successive pairs, each pair including first and second type contacts in opposite rows and having their second end parts to the right and left sides, respectively, of a central axis of the first end part and the coupling part. A distance (d1) between the second end parts of each contact in a pair is less than a distance (d2) between the second end parts of adjacent contacts of two different pairs.

2 Claims, 1 Drawing Sheet

ASYMMETRIC CONTACT AND TERMINAL STRIP EQUIPPED WITH SUCH CONTACTS

The present invention relates to connection devices used in computer local area networks. It relates more particularly to an asymmetric contact and a terminal strip equipped with such contacts.

Prior art computer local area network terminal strips or connection devices include two parallel rows of facing contacts. Successive pairs of contacts of one row are assigned to incoming lines and those of the other row are assigned to outgoing lines to be connected to the incoming lines. They have an end part accessible from one side of the terminal strip, and usually incorporating an insulation-piercing fork, for connecting two conductors of different lines. The opposite end part, inside the terminal strip and for elastic coupling to the facing contacts, is arcuate to press each contact in the terminal strip onto the contact facing it.

The contacts in each row are at a constant pitch which is made as small as possible for reasons associated with the impedance of the lines connected to them and to make the terminal strip as small as possible, with the result that magnetic coupling between the two conductors of the same line is the same as that between two conductors of adjacent lines. This causes crosstalk between adjacent lines on the terminal strip at high operating frequencies, typically from 1 MHz to 100 MHz and even greater.

A prior art solution to this problem entails increasing the pitch of the contacts to reduce the coupling between lines. This causes a discontinuity in the impedance of the lines connected to the contacts and increases the size of the terminal strips, however.

An object of the present invention is to solve this problem in a way which avoids the drawbacks of the prior art solution mentioned above.

The present invention consists in a flat elongate asymmetric contact having a first end part for connection to a conductor, an opposite second end part for connection to another similar contact and a coupling part between the end parts and wherein said second end part is narrower than the first end part and the coupling part, characterized in that said second end part is axially eccentric to said connecting first end part and said coupling part, both aligned axially with each other.

For example, substantially all of said second end part is on one side of the axis of the first end part and the coupling part, and its width is substantially half that of said first end portion.

The invention also consists in a terminal strip equipped with these contacts, wherein said contacts are disposed in two parallel rows of facing contacts and wherein the first end parts of the various contacts are accessible on one side of the terminal strip and the second end parts of the facing contacts are curved and elastically coupled inside the terminal strip, characterized in that said facing contacts of each pair are of first and second types with their second end part respectively to the right and to the left of the axis of the first end part of each of them, defining between the second end parts of the contacts of each pair a distance that is relatively small compared to the relatively large distance between the second end parts of adjacent contacts of different pairs.

The features and advantages of the present invention will emerge from the following description Given with reference to the appended drawings. In the drawings.

Figure 1:
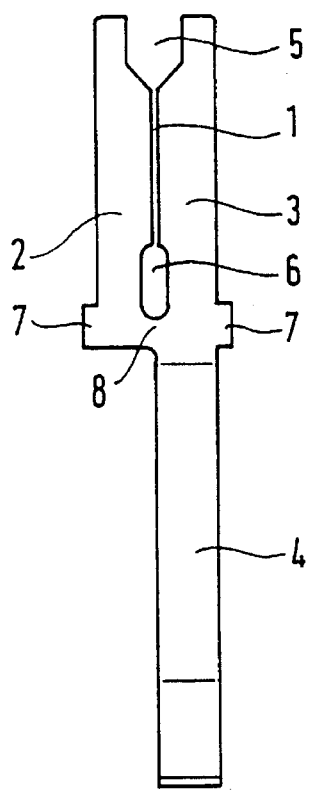
FIG. 1 is an elevation view of a contact of the invention.
Figure 2:
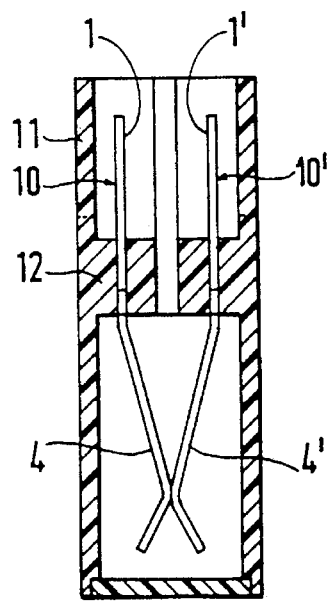
FIGS. 2 and 3 are respectively a view in transverse section and a partial view in axial section of a connecting terminal strip equipped with contacts as shown in FIG. 1.

The contact of the invention is a flat contact. As shown in FIG. 1, it has a substantially axial insulation-piercing fork or slot 1 in one end part of the contact and defining two lateral branches 2 and 3, one on each side of it. It has a coupling tail 4 in the other end part of the contact. This coupling tail is arcuate on one side of the initially flat contact to press it into contact with the coupling tail of another similar contact facing it in a connecting terminal strip (FIG. 2). One end of the insulation-piercing fork is open with an entry Vee 5 at this end. To increase its elasticity, its other end is extended by an opening 6 between the branches 2 and 3. Two lateral teeth 7 are provided on the branches 2 and 3, slightly beyond the opening 6, for retaining the contact. The two branches 2 and 3 are fastened together beyond the opening 6 and jointly define at this level a coupling part 8 joining the two branches to the coupling tail.

In accordance with the invention, the coupling tail 4 is offset to one side of the axis of the insulation-piercing fork 1 and the coupling part axially aligned with it so that it lies substantially to one side only of the insulation-piercing fork, and is substantially the same width as one of the branches 2 and 3, i.e. substantially half the width of the insulation-piercing end part of the contact.

The coupling tail 4 of the contact is aligned with one of the branches 2 and 3 and the other branch is truncated beyond the coupling part 8.

Figure 3:
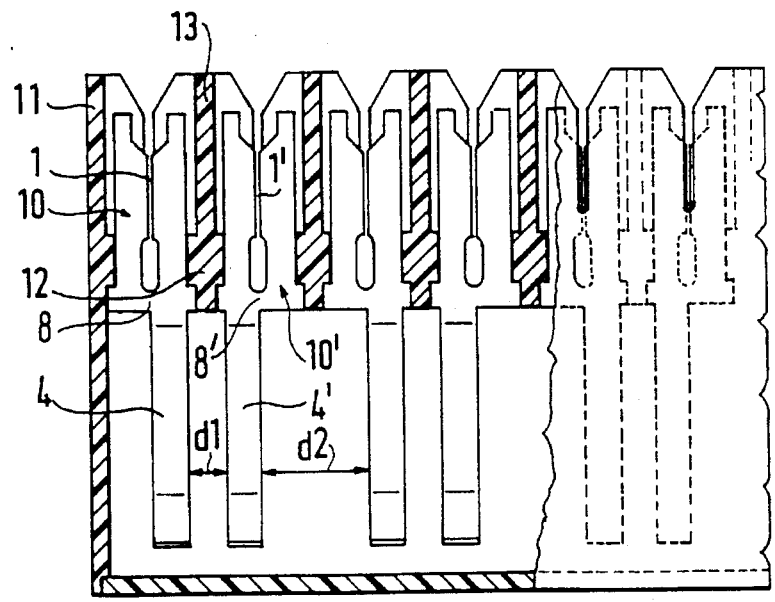

FIGS. 2 and 3 show a terminal strip equipped in accordance with the invention with two rows of these pairs of facing contacts 10, 10'. They define successive pairs of contacts in each row and the rows are in face-to-face relationship in an insulative body 11. They extend through and are retained in an intermediate wall 12 running along the body. They are preferably separated by front partitions 13 projecting in front of this intermediate wall. The insulation-piercing forks 1 and 1' are accessible on the front side of the terminal strip. The coupling tails 4 or 4' of the facing contacts of the two rows are pressed elastically together inside the rear part of the terminal strip. The coupling parts 8 and 8' define with the partitions 12 between them the pitch of the contacts.

As shown in FIG. 3, the two contacts 10 and 10' of each pair are of first and second types so that their coupling tail 4 or 4' is to the right or to the left of the insulation-piercing fork 1 or 1' and so that the distance d1 between the coupling tails 4 and 4' of the contacts of the same pair is small in comparison to the distance d2 between the coupling tails of the contacts of adjacent pairs. Each pair of facing contacts 10 and 10' also comprises one contact of the first type and one contact of the second type (FIG. 2).

The offset of the coupling tail of each contact and the alternating disposition of the two types of contact in each row significantly reduce crosstalk between input and output lines connected to the insulation-piercing forks of the pairs of contacts in the two rows in connecting terminal strips used in computer local area networks. This reduction in crosstalk averages 4 dB to 6 dB in the frequency range from 1 MHz to 100 MHz. It is achieved by the significantly increased distance d2 between the coupling tails of adjacent contacts of two different pairs and without changing the size of the terminal strip and without modifying either the insulating-piercing parts of the contacts or the relative arrangement of these insulating-piercing parts in the front portion of the terminal strip.

We claim:

1. Terminal strip comprising:

an insulative body; and

– a plurality of substantially flat elongate asymmetric contacts supported by said insulative body, each of said contacts having a first end part, a second end part opposite said first end part, and a coupling part between the first and second end parts, wherein said second end part is narrower than said first end part, and said second end part is offset to one side of a central axis of said first end part and said coupling part, wherein said contacts are arranged in two parallel rows so as to face each other, and wherein the first end parts of said contacts are accessible from one side of said insulative body and the second end parts of said contacts are curved toward a central plane defined between the two rows at another side of said insulative body, wherein said contacts are arranged in successive pairs each comprising first and second types of said contacts in opposite rows with their second end parts on right and left sides, respectively, of the central axis of the first end part and the coupling part of each of said contacts, and wherein a first distance ($d1$) is defined between the second end parts of the contacts of each pair, said first distance being relatively small compared to a second distance ($d2$) defined between the second end parts of adjacent contacts of two different pairs.

2. Terminal strip according to claim 1, wherein substantially all of the second end part of each contact is on one side of the central axis of said first end part and said coupling part.

* * * * *